(12) United States Patent
Alpert et al.

(10) Patent No.: US 9,400,849 B1
(45) Date of Patent: *Jul. 26, 2016

(54) SCALABLE SYSTEM FOR DETERMINING SHORT PATHS WITHIN WEB LINK NETWORK

(71) Applicant: Google Inc., Mountain View, CA (US)

(72) Inventors: Jesse Louis Alpert, Ramat HaSharon (IL); Nissan Hajaj, Emerald Hills, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/473,563

(22) Filed: Aug. 29, 2014

Related U.S. Application Data

(63) Continuation of application No. 12/537,717, filed on Aug. 7, 2009, now Pat. No. 8,825,646.

(60) Provisional application No. 61/087,620, filed on Aug. 8, 2008.

(51) Int. Cl.
*G06F 7/00* (2006.01)
*G06F 17/30* (2006.01)

(52) U.S. Cl.
CPC ...... *G06F 17/3089* (2013.01); *G06F 17/30424* (2013.01); *G06F 17/30705* (2013.01); *G06F 17/30958* (2013.01)

(58) Field of Classification Search
CPC ............... G06F 17/30598; G06F 17/30705; G06F 17/30424
USPC ................................................ 707/737, 755
See application file for complete search history.

(56) References Cited

U.S. PATENT DOCUMENTS

| | | | | |
|---|---|---|---|---|
| 5,913,214 A | * | 6/1999 | Madnick | G06F 17/30427 |
| 6,260,036 B1 | * | 7/2001 | Almasi | G06F 17/30598 707/688 |
| 6,263,334 B1 | * | 7/2001 | Fayyad | G06F 17/30333 704/9 |
| 6,269,376 B1 | * | 7/2001 | Dhillon | G06F 17/18 707/613 |
| 6,460,035 B1 | * | 10/2002 | Siegwart | G06F 17/18 707/737 |
| 6,470,331 B1 | * | 10/2002 | Chen | G06F 17/30445 707/718 |
| 6,484,179 B1 | * | 11/2002 | Roccaforte | G06F 17/30592 707/737 |
| 6,778,977 B1 | * | 8/2004 | Avadhanam | G06F 17/30327 707/737 |
| 6,801,949 B1 | * | 10/2004 | Bruck | H04L 29/12009 709/232 |

(Continued)

FOREIGN PATENT DOCUMENTS

WO  WO 2007/041120  4/2007

OTHER PUBLICATIONS

Crobak et al., "Advanced Shortest Paths Algorithms on a Massively-multithreaded Architecture," First Workshop on Multithreaded Architectures and Applications (MTAAP), Long Beach, CA, Mar. 30, 2007, 8 pages.

(Continued)

*Primary Examiner* — Mark E Hershley
(74) *Attorney, Agent, or Firm* — Fish & Richardson P.C.

(57) ABSTRACT

Systems and methods for finding multiple shortest paths. A directed graph representing web resources and links are divided into shards, each shard comprising a portion of the graph representing multiple web resources. Each of the shards is assigned to a server, and a distance table is calculated in parallel for each of the web resources in each shard using a nearest seed computation in the server to which the shard was assigned.

20 Claims, 9 Drawing Sheets

(56) References Cited

U.S. PATENT DOCUMENTS

| | | | | |
|---|---|---|---|---|
| 6,834,278 B2* | 12/2004 | Yu | | G06F 17/30227 707/737 |
| 6,882,997 B1* | 4/2005 | Zhang | | G06F 17/30598 382/225 |
| 6,944,607 B1* | 9/2005 | Zhang | | G06K 9/6223 706/20 |
| 6,978,264 B2* | 12/2005 | Chandrasekar | | G06F 17/30864 |
| 7,152,071 B2* | 12/2006 | Xing | | G06F 17/30 707/737 |
| 7,174,343 B2* | 2/2007 | Campos | | G06F 17/30598 707/737 |
| 7,191,178 B1* | 3/2007 | Phoha | | H04L 67/1008 |
| 7,330,857 B1* | 2/2008 | Svingen | | G06F 17/30613 707/706 |
| 7,395,256 B2* | 7/2008 | Ji | | G06F 17/3071 707/737 |
| 7,676,518 B2* | 3/2010 | Niekamp | | G06K 9/6218 707/737 |
| 7,680,858 B2* | 3/2010 | Poola | | G06F 17/3071 707/736 |
| 7,743,049 B2* | 6/2010 | Yoshida | | G06F 17/3043 707/713 |
| 7,761,448 B2* | 7/2010 | Meyerzon | | G06F 17/30864 704/1 |
| 7,779,008 B2* | 8/2010 | Dageville | | G06F 9/4436 707/737 |
| 7,783,623 B2* | 8/2010 | Acharya | | G06F 17/30749 707/709 |
| 7,801,896 B2* | 9/2010 | Szabo | | G06F 17/30522 707/715 |
| 7,827,179 B2* | 11/2010 | Kusui | | G06F 17/30598 707/737 |
| 7,912,831 B2* | 3/2011 | Joshi | | G06F 17/30705 707/709 |
| 8,346,753 B2* | 1/2013 | Hayes | | G06F 17/30864 707/709 |
| 8,631,094 B1* | 1/2014 | Alpert | | G06F 17/30958 707/631 |
| 8,825,646 B1 | 9/2014 | Alpert et al. | | |
| 2002/0087567 A1* | 7/2002 | Spiegler | | G06F 17/30324 |
| 2002/0138313 A1* | 9/2002 | Fujii | | G06Q 10/02 705/5 |
| 2004/0044962 A1* | 3/2004 | Green | | G06F 17/30864 715/234 |
| 2004/0230764 A1* | 11/2004 | Merchant | | G06F 3/0608 711/173 |
| 2006/0031486 A1* | 2/2006 | Miner | | G06F 17/30864 709/224 |
| 2006/0074903 A1* | 4/2006 | Meyerzon | | G06F 17/30864 |
| 2006/0080400 A1* | 4/2006 | Guha | | G06F 17/30902 709/216 |
| 2006/0153457 A1* | 7/2006 | Nakamura | | G06F 17/30247 382/190 |
| 2006/0218114 A1* | 9/2006 | Weare | | G06F 17/3087 |
| 2007/0101202 A1* | 5/2007 | Garbow | | G06F 11/008 714/47.2 |
| 2007/0239694 A1* | 10/2007 | Singh | | G06F 17/30958 |
| 2007/0244874 A1* | 10/2007 | Tawde | | G06F 17/3071 |
| 2007/0250522 A1* | 10/2007 | Perrizo | | G06N 7/06 |
| 2007/0266029 A1* | 11/2007 | Baskey | | G06F 11/1482 |
| 2008/0033932 A1* | 2/2008 | DeLong | | G06F 17/30864 |
| 2008/0114739 A1* | 5/2008 | Hayes | | G06F 17/30864 |
| 2008/0243889 A1* | 10/2008 | Chen | | G06N 5/022 |
| 2008/0275902 A1* | 11/2008 | Burges | | G06F 17/3089 |
| 2010/0088317 A1* | 4/2010 | Bone | | G06F 17/30144 707/737 |
| 2010/0268701 A1* | 10/2010 | Zhang | | G06F 17/30861 707/709 |

OTHER PUBLICATIONS

Ghemawat et al, "The Google File System," 19th ACM Symposium on Operating Systems Principles, Lake George, NY, Oct. 2003, 15 pages.

Madduri et al., "An Experimental Study of a Parallel Shortest Path Algorithm for Solving Large-scale Instances," 9th DIMACS Implementation Challenge—The Shortest Path Problem, DIMACS Center, Rutgers University, Piscataway, NJ, Nov. 13-14, 2006, 10 pages.

* cited by examiner

SCALABLE SYSTEM FOR DETERMINING SHORT PATHS WITHIN WEB LINK NETWORK

CROSS-REFERENCE TO RELATED APPLICATIONS

This application is a continuation of U.S. application Ser. No. 12/537,717, filed Aug. 7, 2009, which claims the benefit under 35 U.S.C. §119(e) of the filing date of U.S. Application No. 61/087,620, filed Aug. 8, 2008—the entire contents of which are incorporated herein by reference.

BACKGROUND

The present specification is directed to systems, components of systems, and methods performed by them, that can find multiple shortest paths in very large graphs.

Search engines allow users to search billions of web pages for pages of interest to them. Because a given query may produce millions of search results, it is important to be able to rank these search results to present high-quality results to the user. Graph analysis methods, in which the link structure of the web is represented as a graph, have been used to this end. One family of methods is described in commonly-owned U.S. application Ser. No. 11/546,755 (the "'755 application") entitled "Method and apparatus for producing a ranking for pages using distances in a web-link graph," the disclosure of which is incorporated here by reference. In this and other applications, a system required that can compute a shortest path on a weighted directed graph.

A number of techniques for solving shortest paths problems have been implemented. The Dijkstra and the Bellman-Ford algorithms for the single source shortest paths problem have no parallelism and/or are not scalable. (While Bellman-Ford can easily be parallelized, it is not scalable because it requires too many iterations, each propagating messages through all the edges). Others' work on parallelizing the Dijkstra algorithm has resulted in system designs that rely on the use of shared memory, random access to in-memory graph data, and reliable machines. Such designs cannot run across many machines, cannot be realized in the absence of shared memory access, cannot work with large graphs stored on disk, and cannot routinely handle machine failures. Examples of such systems are described in K. Madduri, D. A. Bader, J. W. Berry, and J. R. Crobak, "Parallel Shortest Paths Algorithms for Solving Large-Scale Instances," 9th DIMACS Implementation Challenge—The Shortest Path Problem, DIMACS Center, Rutgers University, Piscataway, N.J., Nov. 13-14, 2006, and J. R. Crobak, J. W. Berry, K. Madduri, and D. A. Bader, "Advanced Shortest Path Algorithms on a Massively-Multithreaded Architecture," First Workshop on Multi-threaded Architectures and Applications (MTAAP), Long Beach, Calif., Mar. 30, 2007. These systems use shared memory models and where the graph data is all in memory, and are described as working on large graph instances having 2 billion edges.

The systems described in this specification can compute single source and multiple source shortest paths for graph instances having trillions of edges and have the capacity to scale to even larger size graphs.

SUMMARY

Computing shortest paths on a weighted digraph is required by many commercial applications. Some applications, in particular those that process graphs of web links, must solve the problem for extremely large digraph instances, i.e., instances of more than a trillion ($10^{12}$) edges. The systems that are described in this specification can process such graphs on a distributed environment in which thousands of computers are used, and in which at least one machine failure during the course of a computation will generally be common. The systems described here can efficiently overcome such failures. Given a large weighted digraph and a set of seed nodes (which may include hundreds of seeds) on a graph, the systems find for each node the n seeds with the shortest paths to the node and the lengths of these paths, where n is a predetermined small positive integer, such as one or three. The systems can handle graphs with hundreds of billions of nodes and trillions of edges. The systems run in a distributed environment, across many machines and efficiently recover from machine failures.

The details of one or more implementations of the subject matter are set forth in the accompanying drawings and the description below. Other features, aspects and advantages of the subject matter will be apparent from the description, drawings, and claims.

BRIEF DESCRIPTION OF THE DRAWINGS

Like reference symbols in the various drawings indicate like elements.

DETAILED DESCRIPTION

Figure 1A:
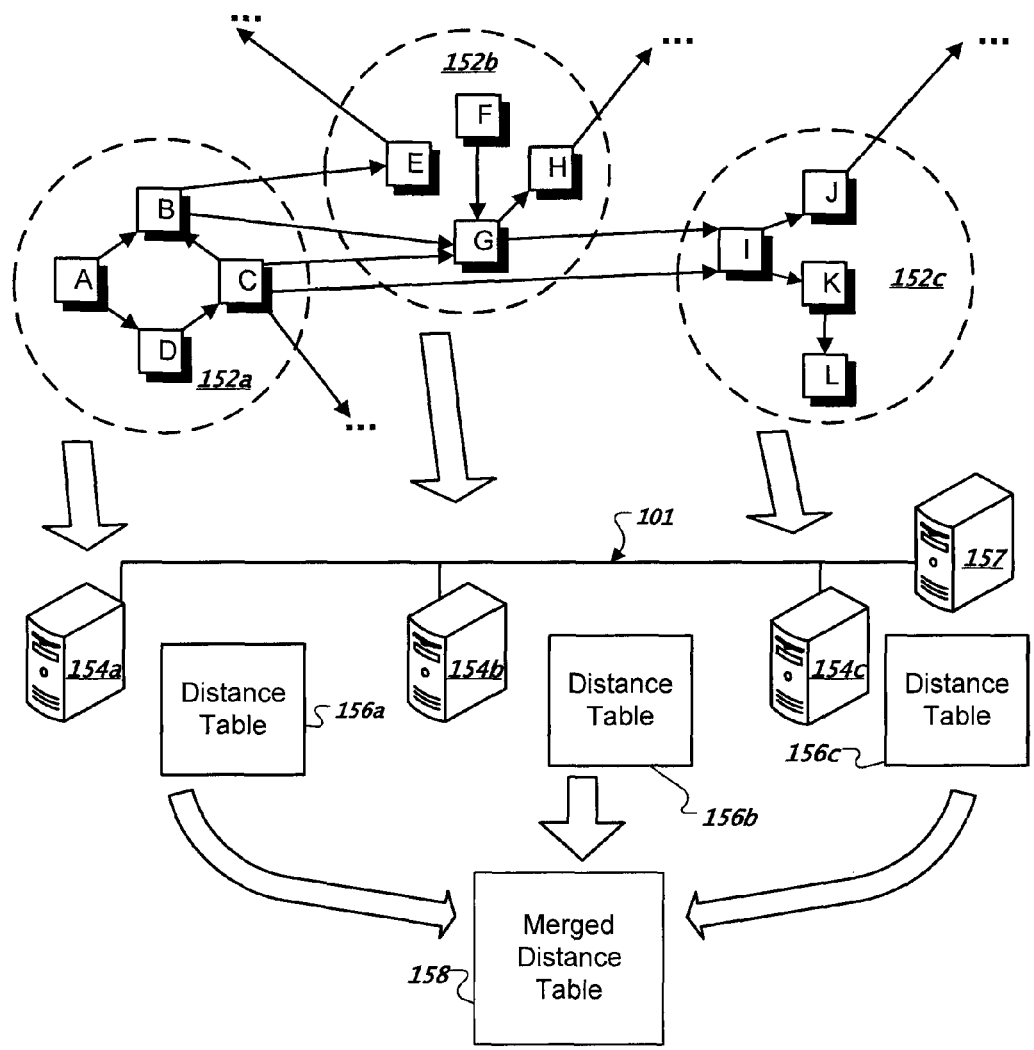
FIG. 1A is a block diagram showing an example web page ranking system.

FIG. 1A is a block diagram showing an example web link structure analysis system 150. The system 150 works on data derived from an analysis of web pages on a network (e.g., the Internet). For example, a crawler application may crawl the network identifying web pages while the crawler application executes. The term "web page" is used generically in this specification to refer to an addressable resource (e.g., an electronic document) that is stored on a server (e.g., a web server) and is accessible through a network resource address, e.g., a universal resource locator (URL). Web pages can include text, images, links, embedded music, videos, and software scripts. In addition, web pages can be dynamically generated (e.g., by a server-side script) or be static. Web pages can be hypertext mark language (HTML) documents, extensible markup language (XML) documents, image files (e.g., JPEG files), or other forms of resources.

Because different URLs can point to the same page on the web, in some implementations such URLs are clustered and each cluster is given an identifier and treated in the graph as a single node. For example, the URLs http://www.google.com/, http://google.com/, and http://www.google.com/index.html all point to the same content. Since the content of the pages in each cluster are the same, the edges going out of each node are based on the outgoing links of any one of the node's (cluster's) members. For each URL cluster, one of the cluster members are selected as the representative. In some implementations, the identifier of the cluster is a 96-bit hash (fingerprint) of this representative URL.

The system divides the identified web pages into subsets. In the depicted example, the system 150 has divided web pages A, B, C, D, E, F, G, H, I, K, and L, into three subsets 152a, 152b, and 152c. Web pages that have known links out to other web pages (their "outgoing links") will be referred to as "source pages." In the depicted example, web page A has links to web pages D and B and is a source page. Web pages that have no such links will be referred to as "leaves" or "leaf pages." A page with outgoing link will nevertheless be a leaf page to the system if the system has no information about the links.

After the system 150 divides the data describing identified web pages and their outgoing links into subsets, which may also be referred to as shards, the system assigns the web pages to servers, which may also be referred to as shard servers or peer servers. In the depicted example, the system 150 assigns the subsets 152a, 152b, and 152c to servers 154a, 154b, and 154c, respectively. The servers will generally be in communication with a master server 157 and each other through a network 101. Thus, each server will have data describing a portion of a directed graph in which each node represents a web page and each directed edge represents an outgoing link. Because it will be necessary for the servers to determine, for any arbitrary page, which server the page belongs to—i.e., which server the page has been assigned to—the assignment of pages to servers is accomplished by a computation that can be performed very quickly. In some implementations, this mapping computation is a hash of a page identifier modulo the number of servers. In other implementations, domain information is used so that pages in the same domains have an increased likelihood (over random assignment) to be assigned to the same servers.

The ultimate task of each server is to compute a nearest seed distances for the web pages assigned to the server, and for the servers collectively and operating in parallel to compute nearest seed distances for the entire input graph. For example, server 154c computes a distance table 156c of nearest seeds for the source pages in the subset 152c. Nearest seed computations are described in more detail below. The servers also compute nearest seed distances for the leaf pages in leaf tables, as will also be described below. Once the computations by the servers 154a-154c are complete, the system 150 combines (actually or virtually) the distance tables 156a-156c and the leaf tables into a single combined distance table 158, which contains the shortest paths computed by the system for each of the pages represented in the input data.

In some scenarios, the edges of the graph are all of equal length (distance). In other scenarios, information about the links represented by the edges, or the web pages represented by target nodes of the edges, is represented by weights assigned to the edges. One such scenario is described in the '755 application. In such and other scenarios, the input data to the servers includes edge weight data (which in effect modifies the lengths of the edges) as well as graph structure data.

The input to the system also includes data identifying seeds. In some scenarios, only one or a few seeds are identified. In others, hundreds or even thousands of seeds may be used. A seed in the web graph context is a particular web page that is preselected according to one or more of its characteristics. For example, seed resources may be chosen based on a page's reliability, diversity of subject matter, or other characteristics. Seeds and seed selection is described in more detail below. Thus, the linked graph 100 may be a weighted directed and cyclical graph in which some of the nodes are designated as seeds.

Each server ultimately computes the n closest seeds to each of the server's nodes and the distance values from each node to each of its respective closest seeds. To identify seeds, the set of pages may be analyzed and one or more seeds selected from the set of pages according to a selection criterion. In some implementations, seeds are identified using a partially or fully manual process and provided to the system as a list of page identifiers. As already mentioned, in the system the data and the processing are distributed across many servers, in some implementations, across more than one thousand servers. Each server processes a shard of the input and output data corresponding to its nodes.

Because the system is designed for processing very large graphs, the graph data shards are too large to be stored in random access memory (RAM) and so must be stored on disk memory or some other form of mass storage memory; however, the number of servers is selected so that the distance table and the current portions of the leaf table of each server can be stored in the RAM of the server.

The system can store the link graph 100 using any number of storage mechanisms. For example, in some implementations, the system may store the linked graph 100 on a distributed global file system (GFS). One implementation of such a file system is described in Ghemawat, et al, *The Google Global File System,* 19th ACM Symposium on Operating Systems Principles. The linked graph 100 may be stored in one or more link map files on the GFS. Each link map file contains a representation of the nodes and their outgoing links (identifying the target nodes) for a portion of the linked graph 100. The link map files may be replicated to provide redundancy if a disk fails, or is otherwise inaccessible.

Each server processes distance update messages which it receives from other servers or generates itself and updates the nearest seed data in its distance and leaf tables as appropriate. Each server generates distance update messages, as will be described, as a consequence of updating the nearest seed information for its nodes. A server receiving an update message determines whether the update includes better information (i.e., a shorter distance) than is represented in the receiving server's distance table, applies the update if it does, and ignores it otherwise.

Each server uses three tables:

1) A link table, stored on disk, represents the shard's part of the link graph. Each row in the link table represents a node and identifies all the outgoing links from the node. To identify the target nodes that may have to be notified of a change in a nearest seed distance of a node N1 owned by a server, the server will look up the node N1 in its link table and find all the nodes to which N1 has outgoing links.

2) A distance table, stored in RAM, has a structure that parallels that of the link table, having the same ordering of nodes as the link table does. For each of the server's nodes, the distance table has n seed and distance pairs. This data represents the server's best information as to which n seeds are closest to each of its nodes and the distance from each node to its closest n seeds. The distance table represents the state of the computation, and is updated in response to update messages. The table also includes a dirty bit, which when set indicates for a node and a nearest seed to that node that the nearest distance information for the node node-seed combination has to be propagated to the nodes on the outgoing links from the node. When the server is determining what updates to send, this table is scanned sequentially, and the nodes that have to be looked up in the link table are therefore identified in the right order for sequential reading.

3) A leaf table is similar to the distance table, except not all of it is kept in RAM. Also, because leaves have no outgoing links, no dirty bit information needs to be maintained. In systems where there are many more leaf nodes than source nodes, the leaf table data is accumulated in RAM in a hashed data structure, the node identifier being the hashed key, and when RAM fills up, the data is written to disk in node-sorted order and operation continues. At the end of the computation for the entire graph, all the disk data is merged, keeping the shortest distances recorded for each leaf.

In order to reduce the disk seek latency, local copies of the link table are maintained by the server and generally spread over multiple disks. Link table lookups are performed on separate I/O threads one thread per local disk. Distribution of the link table among multiple local disks of the server is described below. Therefore, other threads are not blocked waiting for I/O unless they have nothing else to do. Worker threads scan the distance table in order looking for dirty entries, i.e., entries that have a dirty bit set, that satisfy a distance threshold, which will be described. The nodes belonging to such dirty entries are placed on a queue for the lookup threads to fetch. The queue is kept as full as possible, so that the seek results (outgoing links for the marked nodes) are ready when they are needed for distance update propagation. This allows for efficient processing of nodes in sorted order and substantially reduces disk access bottlenecks.

Figure 1B:
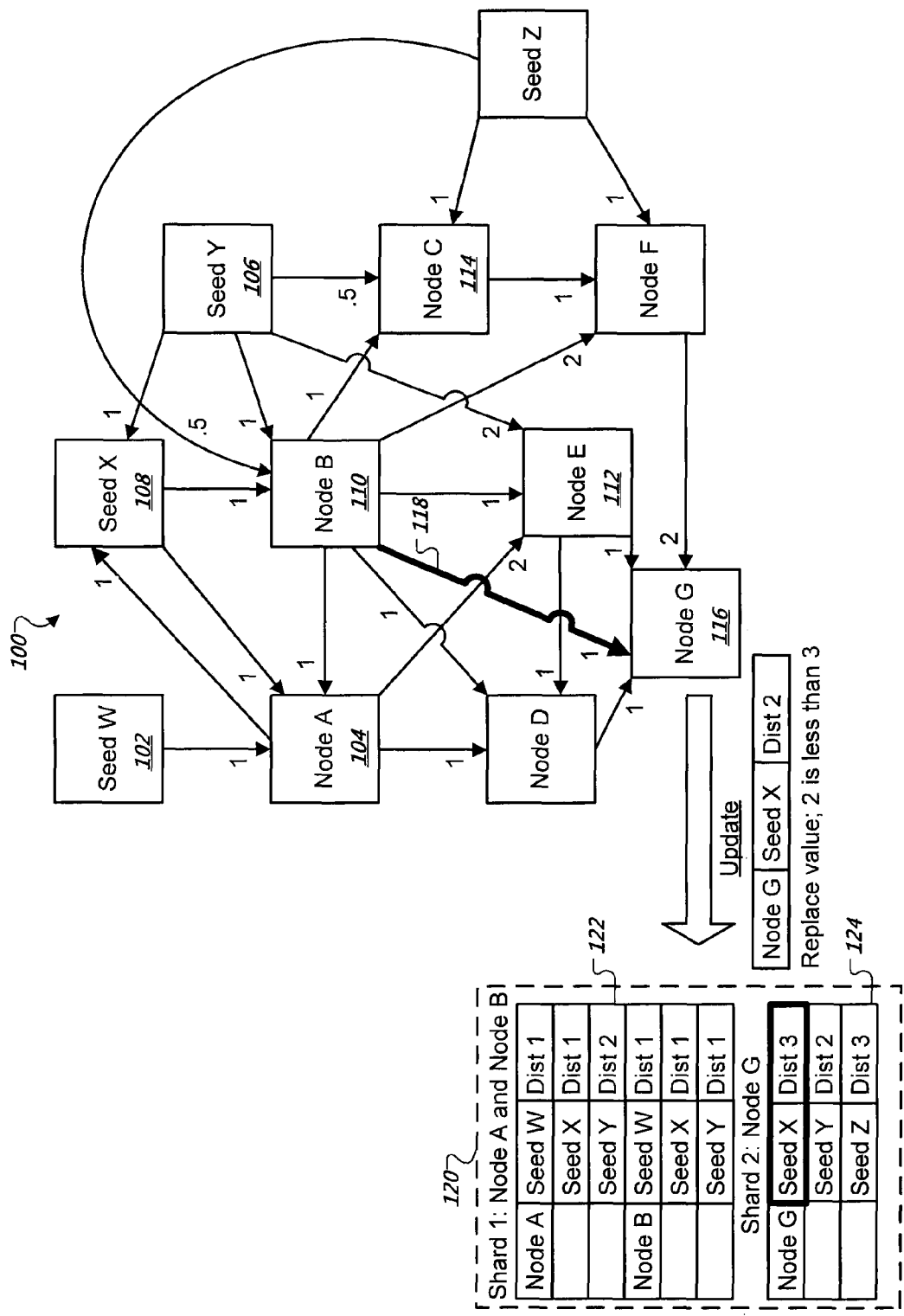
FIGS. 1B and 1C are block diagrams showing example linked graphs and corresponding distance tables.
Figure 1C:
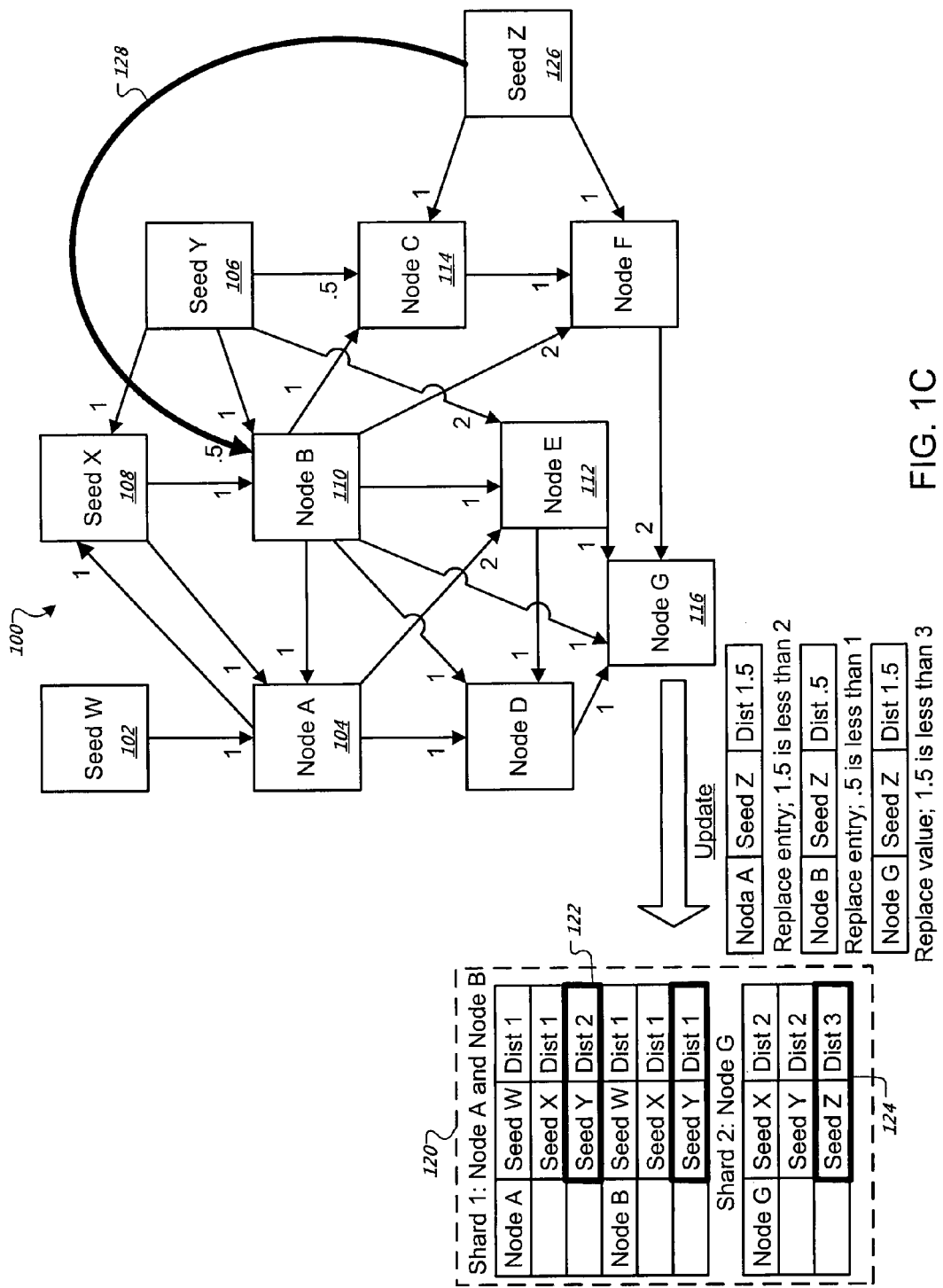

FIGS. 1B and 1C are block diagrams showing an example graph 100 and corresponding distance tables 120. Seed W 102 has a single outgoing link to Node A 104. Seed Y 106 has outgoing links to Seed X 108, Node B 110, Node E 112, and Node C 114 with lengths or distance values of 1, 1, 2, and 0.5, respectively.

As illustrated by FIGS. 1B and 1C, a first shard server is configured to store in RAM a portion of distance table 120 corresponding to distances from any number of seeds to Node A 104 and Node B 110 (distance table portion 122) and the other nodes that are assigned to the first shard server. A second shard server is similarly configured to store in RAM a portion of distance table 120 corresponding to distances from any number of seeds to Node G (distance table portion 124) and many other nodes Each portion of the distance table computed by the shard servers will ultimately be combined to generate a complete distance table (distance table 120). In some implementations, the combination of the portions is performed virtually. Thus, because the system knows which shard servers store the nearest seed distances in accordance with the shard assignment, the system may access the portion of the distance table on the appropriate shard server without having to combine all of the distance table portions into a single distance table. In some implementations, one use of the results is in ranking nodes, where a shorter distance to an n-th nearest seed indicates a higher quality.

A shard server will receive distance updates, which may come from the server itself, but will generally come from other servers. A distance update sent from sending shard server to a receiving shard server includes the identification of a node owned by the receiving shard server, the identification of the seed, and the distance from the node to seed as determined by the sending shard server. The update can be accepted or ignored by the receiving shard server. In some implementations, when an update is sent, the corresponding entry in the sending shard distance table is marked as clean. In some implementations, the entry in the sending shard server is marked as clean without regard to whether receipt of the update was acknowledged.

For example, in reference to FIG. 1B, a distance update is generated for the distance value of 2 for the distance from Seed X 108 to Node G 116. As depicted in the example, the new distance value of 2 is less than the current distance value of 3 for the distance between Seed X and node G in the distance table 124 of the shard server that owns node G. Because the distance is less than what that server has as the distance, it is used to modify the node-to-seed distance value, which is consequently marked as dirty. The information in the dirty entries is generally propagated by update messages to the servers owning the corresponding target nodes. Thus, any distance update may initialize a cascade of distance update messages.

In reference to FIG. 1C, the server can send an update to Node B, as illustrated by the updated distance value 0.5, and represented by connector 128. In response, distance updates are transmitted to the shard servers assigned to Node A 104, Node B 110, and Node G 116. As depicted by the example, the shard servers may use the updates to both replace distance values (e.g., as described above), and replace entire entries in the distance table portions. The largest value of the distance table portion 122 may be replaced (e.g., the previous entry removed and a new entry added) because the new distance value for a new seed is smaller than the distance values for one of the current seeds (e.g., the distance value for Seed Z 126 is shorter than the distance value for Seed Y 106). In both cases, the entry is marked as dirty.

In some implementations, the distance table maintains, for each nearest seed of a node, the identity of the previous node in the path from the nearest seed to the node. In such implementations, each update message includes, in addition to seed and distance, the identifier of the source node on the path. With this information, when the computation is complete, for each node, the path to each nearest seed can be determined.

In some implementations, each server filters for outgoing update messages to reduce the sending of unnecessary messages. In some implementations, a table keyed by target node contains the best shortest path data sent to the target node by the server thus far. Before an update message is sent by the server, the message target node of the message is looked up in the table and if it shows that the server has already sent a message with the same or a shorter distance between target and the seed of the message, the message is not sent. The keys of this filter table are selected either statically before the computation or dynamically during the computation. The keys are selected so as to include as nearly as practicable the most popular target nodes in the graph (i.e., the nodes with the most outgoing links directed to them).

In some implementations, the system uses an adaptive propagation threshold that may be different for each shard server and that determines which updates the shard server will actually propagate. A shard server will generate update messages only if the distance in the message is less than a certain threshold. This means that as the server is scanning the distance table, the only nodes it will look up in the link table (and, most importantly, the only nodes for which it will perform disk operations) are the nodes for which a dirty seed value satisfies the propagation threshold. As the computation proceeds, the information about near seeds will become stable (i.e., not be updated and become dirty), so the threshold will increase to cause information about farther seeds to be propagated, until the threshold is at a maximum value (no threshold limit) and the entire computation is completed.

The propagation threshold may be adjusted dynamically by the shard server itself to maintain a specified propagation ratio, such as a propagation ratio of 1-in-6 (i.e., only 1-in-6 distance updates (dirty records) are actually transmitted). The propagation threshold value determines a distance threshold for the distance updates. If more than 1-in-6 distance updates are being transmitted, the threshold value is lowered. Conversely, if fewer than 1-in-6 distance updates are transmitted, the threshold value is increased. The propagation threshold may be used to reduce the bandwidth requirements for processing the distance updates. The propagation threshold generally reduces the number of redundant distance updates the server sends (that is, updates containing distances that will later be overridden by shorter distances). The higher the threshold, the more parallelism and better disk throughput that is achieved, at the cost of sending more redundant updates to the peers.

The propagation threshold for a shard server may be adjusted, in response to system-wide conditions, by a master server or process that monitors the progress of the computation. In some implementations, the progress of the computation is represented by propagation threshold values provided by the shard servers to the master. A shard server having a threshold substantially lower than that of the other servers, for example, within the bottom 10% of the thresholds, would likely proceed more quickly with a higher threshold. The master can determine that the increased burden on the other servers of receiving more updates will be outweighed by the quicker conclusion of the entire computation resulting from the lagging server processing its own dirty data more quickly, in which case the master server will instruct the lagging server to increase its propagation threshold.

Figure 2:
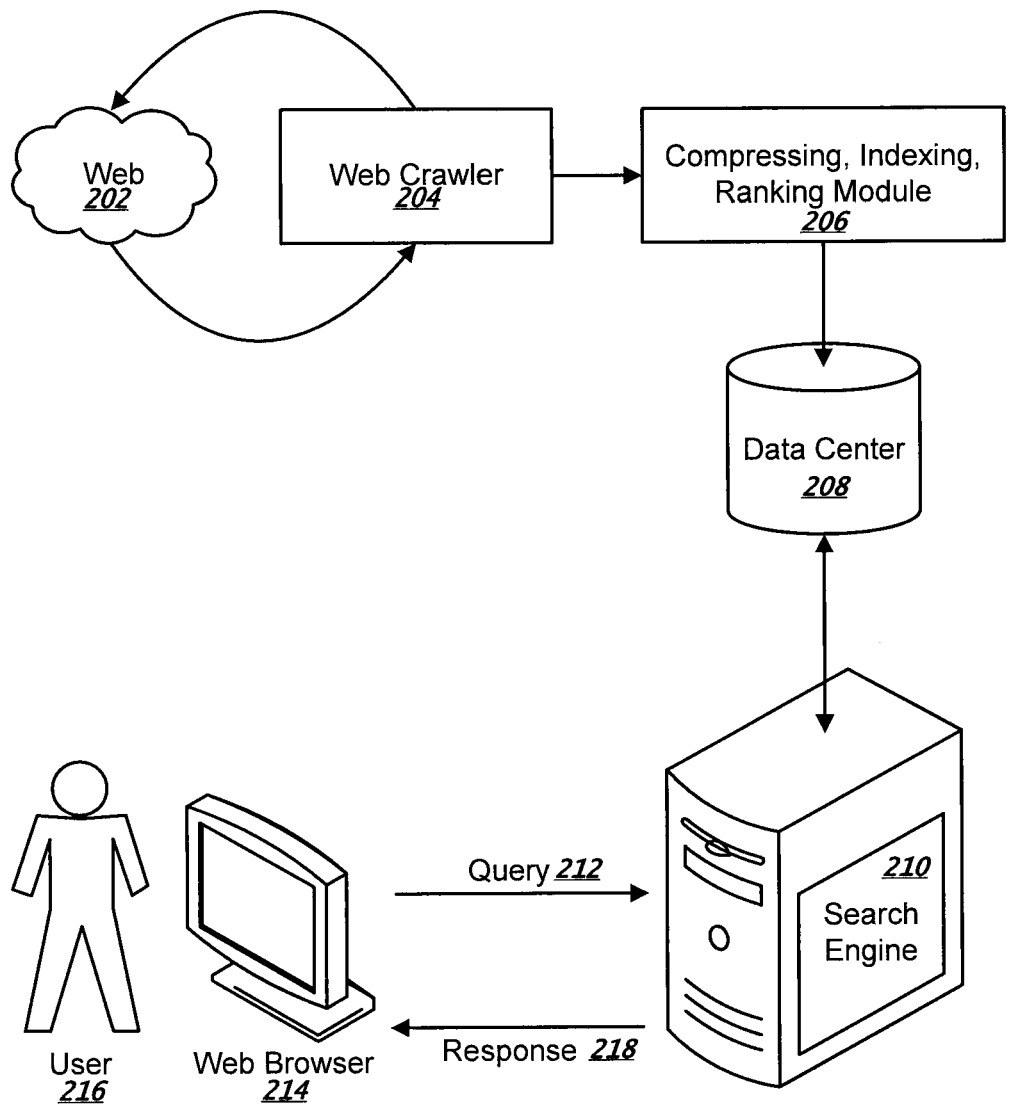
FIG. 2 is a block diagram showing an example search system.

FIG. 2 is a block diagram showing an example search system 200. The example search system 200 is capable of crawling, ranking, and searching the contents of web pages or other electronic documents on a network (e.g., the Internet).

During the crawling process, a web crawler 204 crawls or otherwise searches through websites on web 202 to select web pages to be stored in indexed form in data center 208. The web crawler 204 may prioritize the crawling process by using the page quality measures. The selected web pages are then compressed, indexed and ranked in module 206 using the quality measures determined by a nearest seeds computation, and stored in data center 208.

During a subsequent search process, a search engine 210 receives a query 212 from a user 216, generally through a web browser 214. The query 212 may be a Boolean query, a natural language query, other type of query, or a combination of them. In response to query 212, search engine 210 uses the page quality measures to identify highly ranked documents that satisfy the query 212. The search engine 210 then returns a response 218 to the user, where the response 218 provides references to the identified documents (e.g., URL links, thumbnail images, or other references).

The compression, indexing and ranking module 206 can receive a link graph and a list of the nodes of the link graph to be used as seeds. In addition, the module 206 can divide the link graph into shards and compute nearest seed distances using a large number of shard servers as described above.

Figure 3:
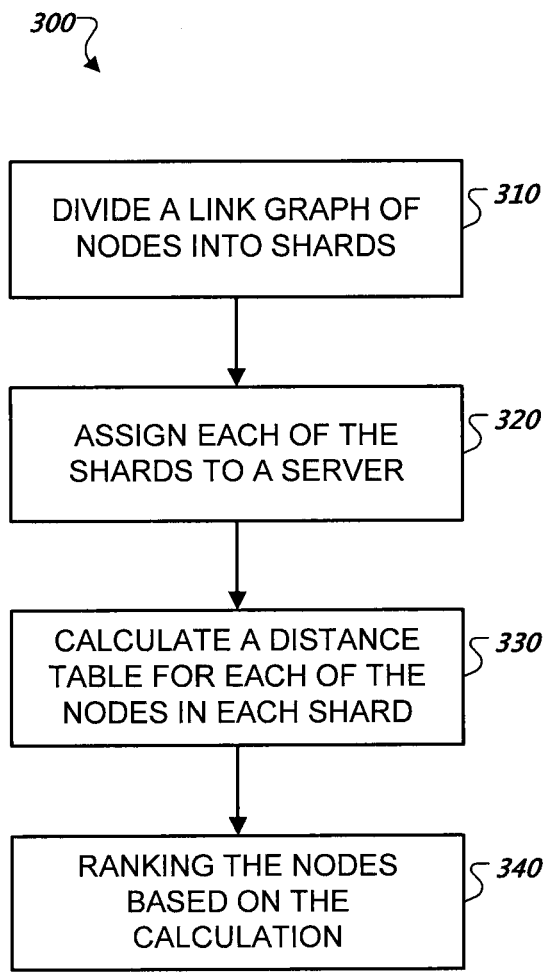
FIG. 3 is a flow chart of an example process for determining values of a distance table.

FIG. 3 is a flow chart of an example process 300 for determining values of a distance table. For convenience, process 300 will be described in reference to a system that is configured with program instructions (e.g., one or more computer software modules) that when executed performs process 300.

The system divides a link graph of nodes into shards (310) and assigns each of the shards to a server (320). The system calculates, in parallel, a nearest seeds distance table for each of the nodes in each shard (330). Using the final result of the calculation, the system ranks the nodes (340). For example, web pages associated with shorter nearest seed distances may receive higher page rankings. Generally, as distance other than the distance to the closest seed is used. In some implementations, the third closest seed is used in calculating a ranking.

Process 300 will generally be re-executed after the link graph 100 changes, i.e., new links are added, or nodes are added or deleted, or weights change. The shard servers can access the local copies of the respective information and retrieve the additional update information from the GFS.

Figure 4:
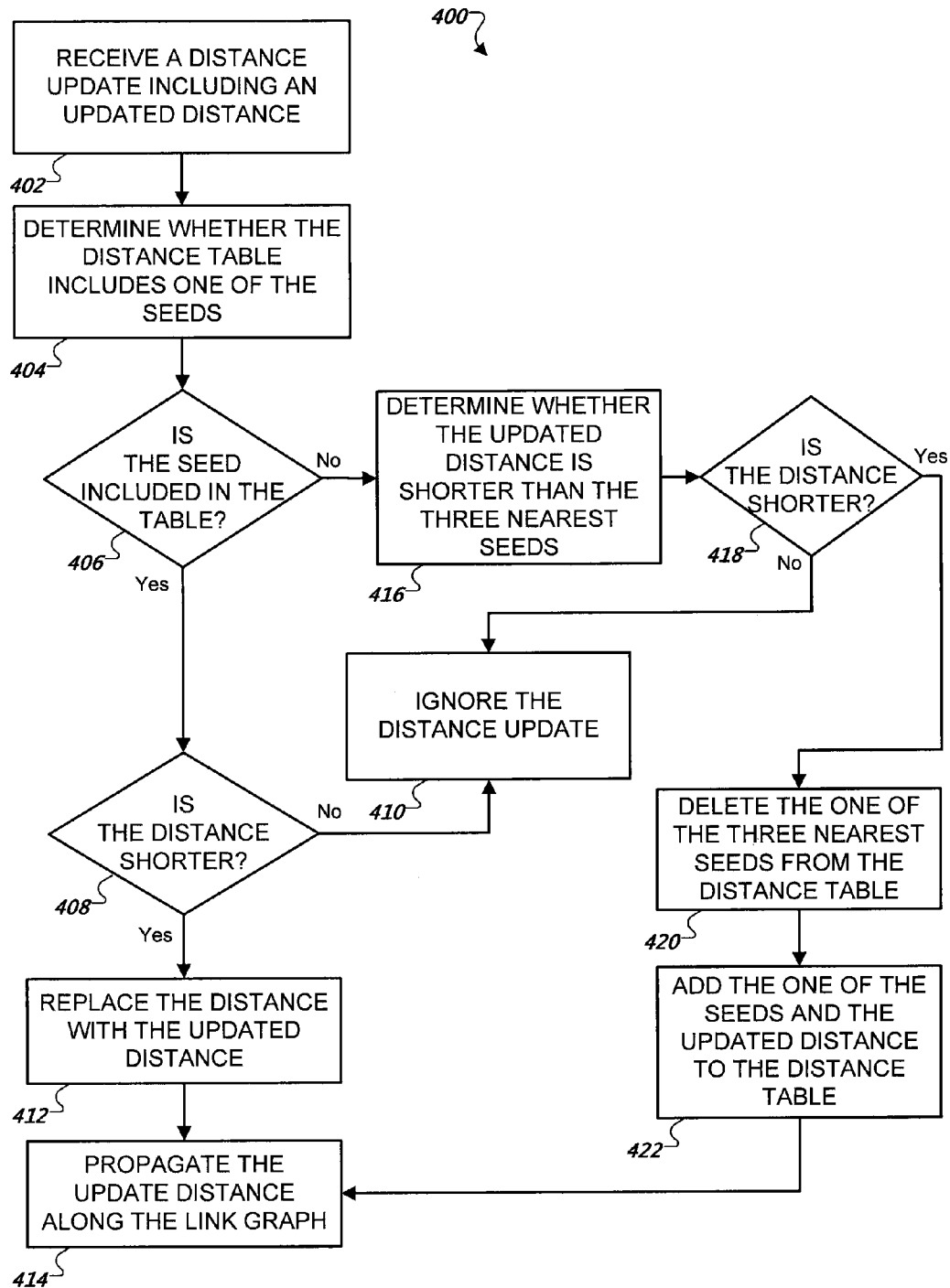
FIG. 4 is a flow chart of an example process for modifying a distance table in response to a distance update.

FIG. 4 is a flow chart of an example process 400 for modifying a distance table in response to a distance update. For convenience, process 400 will be described in reference to a shard server that is configured with program instructions (e.g., one or more computer applications) that when executed performs process 400. Process 400 may be used to modify a portion of a distance table. For example, in reference to FIG. 1B, process 400 may be used to modify portion 122 of distance table 120.

The shard server receives a distance update including an updated distance (402). The distance update may be received in a message from another shard. The distance update includes a distance, a seed identifier, and a destination node identifier. For example, in reference to FIG. 1B, the shard server assigned process distance updates for Node G 116 receives a distance update that includes a distance value of 2, a seed identifier identifying Seed X 108, and destination page identifier of Node G 116. This tells the shard server that receives the update (and that owns Node G) that the shortest distance between Node G and Seed X is 2 and maybe less.

The shard server also determines whether the distance table includes, for the destination node, one of the seeds in the distance update (404). If the seed is found in the table for the node (406), the shard server determines if the distance value is shorter than the current distance for the seed and the node (408). If the distance value is not shorter, the shard server ignores the received distance update (410). Otherwise, the shard server replaces the distance with the updated distance value (412). Later, the shard server propagates the updated distance value to other shards along the link graph (414) by the process of scanning the distance table for dirty entries that satisfy the propagation threshold, as described above.

If the seed is not included in the distance table (406), the shard server determines whether the updated distance is shorter than the n nearest seeds (416). If the distance is not shorter (418), the shard server ignores the distance update (410). Otherwise, the distance is shorter (418) and the shard server deletes one of the three nearest seeds from the distance table (420).

The shard server may replace a deleted entry in the distance table by adding the distance update that includes the distance value, a seed identifier and a destination page identifier to the distance table (422). Moreover, the shard server may use the added seed and updated distance to generate a distance update that is propagated through the link graph (414), as described above.

Checkpointing

Checkpoint are files stored by shard servers and represented the state of their respective computations at particular points in time. Shard servers will each store a sequence of distance table checkpoints and leaf table checkpoints (also referred to as leaf table flushes). Because the data in distance tables is sorted by node identifier, and the leaf data is sorted before being written out, at the end of the entire computation, the final result can be determined simply by actually or virtually merging the distance and leaf checkpoints of all the shard servers.

More specifically, once the leaf table reaches a certain size, it is flushed to a disk file in node identifier sorted order, so that it is sorted the same way the distance table is. If flushing occurs too infrequently or too slowly, the leaf table may grow to a maximum allowed size, causing the server to stop processing incoming updates, so as not to run out of memory. The size of the leaf table is a tradeoff between memory consumption and the amount of data written to disk. The larger the table the higher the chances of updating an existing in-memory leaf entry before it is flushed to disk (leaf disk space).

At predetermined time intervals, or at times of low activity, or after many changes have accumulated, each shard server stores an incremental checkpoint of the distance table and of the leaf table on a reliable data store, e.g., as a distance table increment file and a leaf table increment file on a GFS. The leaf table may be flushed at other times as well. Checkpoints may be used for failure recover in the event of a server failure, whether a software failure, a hardware failure, or other failures that prevents the shard server from processing distance updates. The term "checkpoint" is used within this specification to describe a data structure that may describe a state change in a portion of the distance table respective to a particular shard server and a particular time interval. Each checkpoint includes a timestamp and a delta representing the changes to the data from the previous checkpoint. The shard servers will generally write checkpoints to the GFS independently of one another, and their regular interval times may include an element of pseudo-randomness so as to smooth out the demand for GFS resources. Because each shard server determines when a particular checkpoint is written to the GFS, the process is asynchronous.

The advantages of this design are several: Each server writes checkpoints independently of the other server. When not much is changing on a server, checkpoints are small and take a short time to write. State changes since time T for a specific server can be recovered using only the information in the checkpoints written by other servers after time T and in the not-checkpointed memory (uncommitted memory) of the other servers. The last point is especially significant for the peer recovery process described in the next section. This allows a server to use its own set of checkpoints to find all updates, which should be sent to a peer who has recovered from a different set of checkpoints.

In order to implement this incremental checkpointing design an "uncommitted" bit is added for each distance table entry. This bit specifies whether the entry has been updated (cleaned or dirtied) since the last checkpoint was written. This uncommitted bit is turned on when the server changes the state of a distance table entry, whether from clean to dirty or from dirty to clean, and is turned off when the server commits the entry to the next checkpoint.

Before writing a checkpoint the server enters drain mode. In drain mode the server stops propagating new updates; in other words, no entries are cleaned. The server then waits for all outstanding updates to be acknowledged by its peers (i.e., by the other shard servers performing the computation). In alternative implementations, the server appends all outstanding updates to the checkpoint. Drain mode is not synchronized across servers; that is, each server can enter drain mode independently before writing a checkpoint, just as each server can write checkpoints without regard to when other servers are writing checkpoints.

Once there are no more outstanding updates, the server iterates through the distance table and write out all uncommitted entries to the checkpoint file. The server also clears the uncommitted bit of these entries as the server writes them out. During this time other threads are free to process incoming updates dirtying more entries; however, the server does not clean any entries in the table (i.e., it cannot propagate updates).

The checkpoint includes the time at which checkpointing started, which will be called the checkpoint timestamp. Checkpoints written this way have the following two properties: (1) A checkpoint of time T, together with all previous checkpoints, include (at least) all incoming updates acknowledged by the server before time T. (2) All outgoing updates acknowledged by peers after time T are included in checkpoints with timestamps that are later than T, or in uncommitted memory entries.

This means that when a server recovers from a failure and restores itself to a checkpoint with time T, it needs only incoming updates that were it acknowledged after time T. This also means that its peers, using their checkpoints, can identify and resend these updates and not have to resend updates for all pages.

When writing a checkpoint with a timestamp T, the server must make sure all leaf entries updated before time T are also committed, i.e., flushed to disk. This is because if the server ends up recovering from this checkpoint, the server will only request resending of updates acknowledged by the server after time T. The server achieves this by flushing the leaf table every time the server writes a checkpoint. Each checkpoint has a corresponding leaf file. A checkpoint file is valid only if its corresponding leaf file is valid and all checkpoint files and leaf files written before it are valid. If one of these files is missing or corrupt, the server discards all files written after that. The server also discards all leaf files written after last valid checkpoint file, because the server will request resending of their corresponding updates.

At its regular interval time for writing checkpoints, a server will write a checkpoint even if the checkpoint is empty so as to provide a later timestamp for any recovery process.

Failure Recovery

When a server is restarted after a failure, it goes through an initialization process, which includes reading its valid checkpoint files (distance and leaf).

After initialization is complete, the server is considered up-to-date with respect to the timestamp of its last checkpoint (or timestamp 0 if no valid checkpoints were found). This means the server needs all updates that were acknowledge by the server after that timestamp. The server is expecting (possible) recovery updates and a recovery complete message from all peers.

Once a server gets a recovery complete message from a peer, the server is considered up-to-date with respect to that peer; that is, the server no longer needs recovery updates from that peer. Once a server gets recovery complete messages from all peers, the server is up-to-date with respect to all peers, the server is no longer recovering and only then may the server begin writing checkpoints.

After initialization a server sends "Hello" messages to all the peers. Hello messages and responses contain the same data, which identifies the sending shard, the start up time, and an optional timestamp.

The startup time can be used by the recipient peer to tell if the message is an old or duplicate message that may be ignored.

Assuming a Hello message (or response) is going from server A to server B, if the timestamp is not present, this means that server A knows he is up-to-date with respect to B. Both servers now know that B will not send recovery updates to A. If a timestamp is present (which may be 0), this means server A needs server B to send all updates which where acknowledged by server A after the timestamp. Both servers know that server B has to send recovery updates and server A is waiting for a recovery complete message from server B.

The following optimization can also be implemented: When starting up in recovery, a server B does not send updates to a peer until the server B receives a first Hello message (or response) from that peer. So if this is the first Hello message received by B from A, and if the message includes a timestamp that is greater than the timestamp from which B has recovered (or they are both 0), then B may send a recovery complete message to A right away and skip the recovery cycle.

When a server determines that it has to send recovery updates acknowledged after time T to a peer, it will iterate through the distance table and all checkpoint files written after time T (i.e., having a timestamp after time T) and will propagate all the current data for all entries that are included in the checkpoints or marked as uncommitted in the table.

A server may be sending updates to more than one recovering peer at once.

Figure 5A:
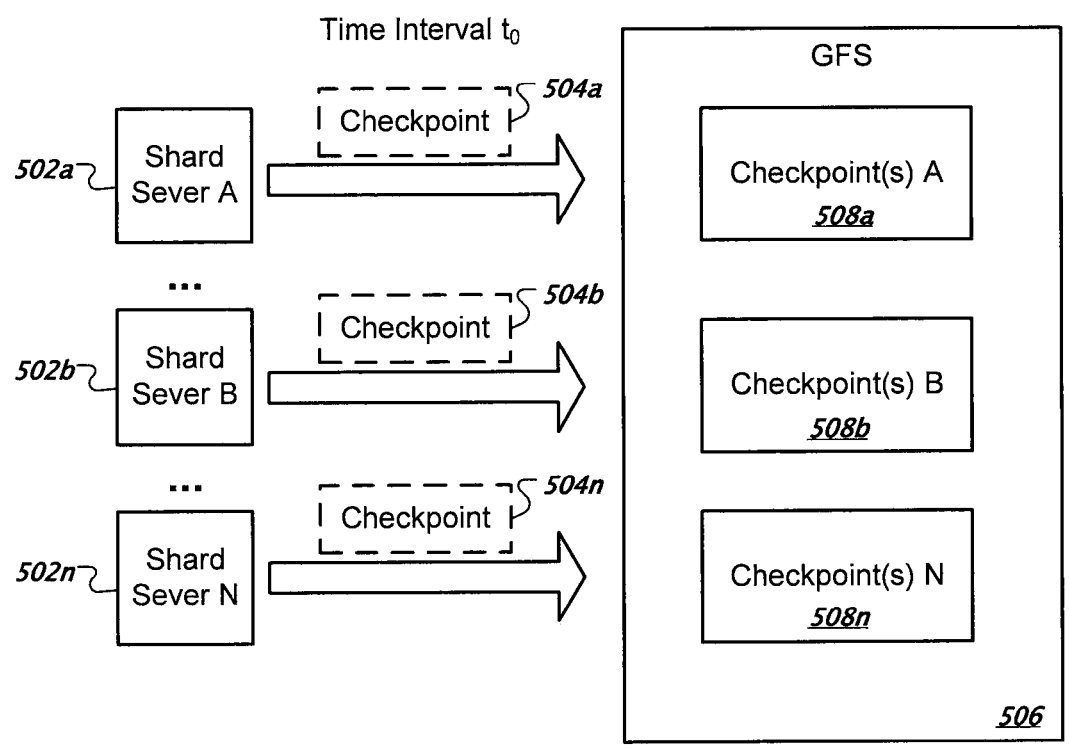
FIG. 5A is a block diagram showing example shard servers, checkpoints, and a global file system at a first time interval.
Figure 5B:
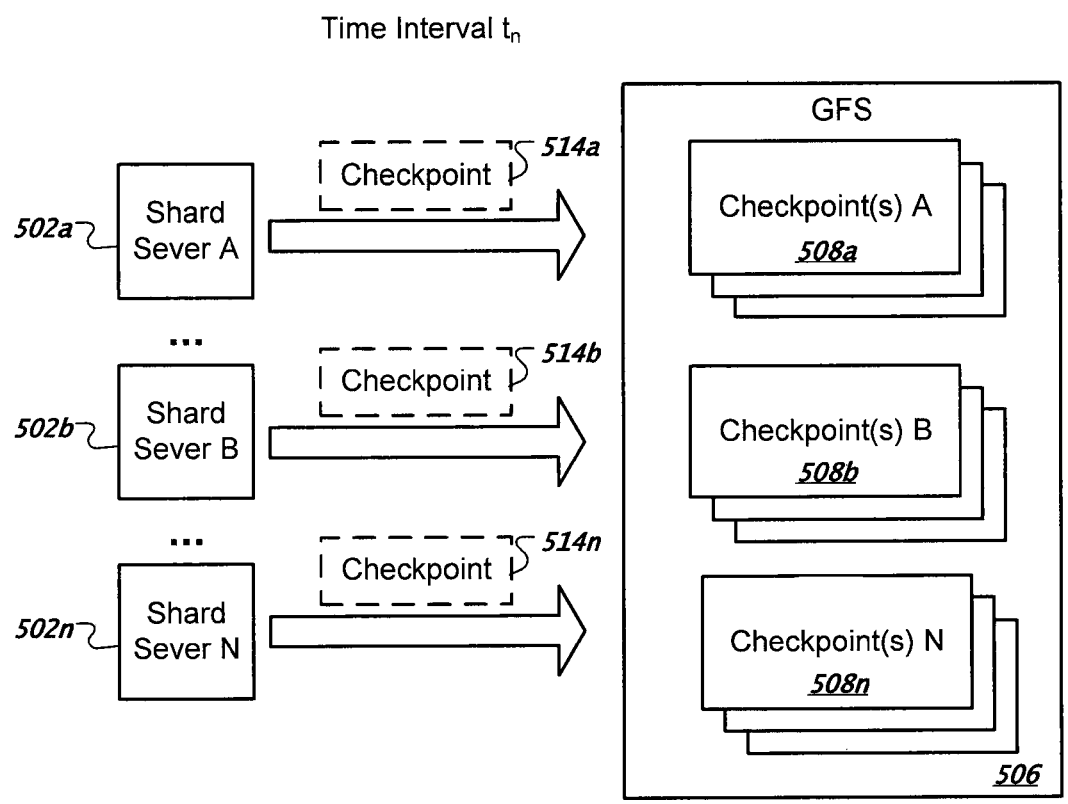
FIG. 5B is a block diagram showing example shard servers, checkpoints, and a global file system at a second time interval.

FIGS. 5A and 5B are block diagrams illustrating shard servers and checkpoints generated according to the process described above at two different times. FIG. 5A is a block diagram showing example shard servers 502a, 502b, and 502n, checkpoints 504a, 504b, and 504n, and a global file system 506 at a first time t0. Shard servers 502a, 502b, and 502n periodically store checkpoints 504a, 504b, and 504n as files on the GFS 506.

The GFS 506 includes storage 508a, 508b, and 508n for one or more checkpoints from the shard servers 502a, 502b, and 502n, respectively. The GFS 506 may provide access to the storage 508a, 508b, and 508n using conventional I/O techniques. In the depicted example of FIG. 5A, the storage 508a, 508b, and 508n include few checkpoints, corresponding to a short elapsed time.

FIG. 5B is a block diagram showing example shard servers 502a, 502b, and 502n, checkpoints 514a, 514b, and 514n, and a global file system 506 at a second time tn. In the depicted example of FIG. 5B, because time tn is later than time t0, more checkpoints are stored in storage 508a, 508b, and 508n. During time interval tn, the shard servers 502a, 502b, and 502n generate checkpoints 514a, 514b, and 514n, respectively, according to a determination of the state of their respective distance tables. Checkpoints 514a, 514b, and 514n may be stored with the other checkpoints 504a, 504b, and 504n and organized using any number of techniques. For example, checkpoints 504a and 514a may be stored in a close physical proximity on the storage media, which allows the checkpoints to be accessed more quickly. Each server 502a, 502b, and 502n may write its checkpoints independently, and at any given time, each server may have written a different number of checkpoints.

As described above, the shard servers 502a, 502b, and 502n may determine if entries in the distance table have been updated since the previous time interval. Thus, the checkpoints 504a, 504b, 504n, 514a, 514b, and 514 are depicted as being optional, since shard servers 502a, 502b, and 502n may not generate a checkpoint at each time interval, according to the state of the shard servers' respective distance tables. In addition, the shard servers may work asynchronously. Each shard server may use a different time interval when determining if a checkpoint should be stored on the GFS 506. In some implementations, each server decides for itself when to write a checkpoint.

Checkpoints (e.g., checkpoints 508a, 508b, or 508n) may be used to recover a portion of a particular shard server's distance table if the shard server encounters a software failure, a hardware failure, or other failures that requires the shard server to be restarted. For example, consider checkpoints generated at times t0, t1, t2, and t3. If a shard server ceases computing distance updates at time t3 (but before time t4), due to a hardware failure, the shard server may be reestablished by processing the checkpoints generated at time intervals t0-t3. Additionally, once the reinitialized shard server has received the checkpoint information from the GFS for the appropriate time intervals, the shard server may send one or more update requests using the information included in the checkpoints, which are received by other shard servers.

The other shard servers may use the information in the update requests to send any relevant updates to the reinitializing shard server. For example, since the reinitialized shard server is current through time interval t3 (e.g., because the shard server received distance table information up through time interval t3 from the GFS), the reinitialized shard server may send out update requests with a time stamp of t3. Other shard servers may receive the request, and compare the timestamp t3 with the current time t3'. The other shard servers may determine if any distance updates were sent to the reinitialized shard server between t3 and t3 and send distance updates as appropriate. In some implementations, a shard server that is reestablished utilizes a different processing apparatus. Thus, the reestablished shard server may be located on a different server or processor, to name two examples. While the shard server is being reestablished, other shard servers will continue processing and generating distance updates while the restarted server recovers.

In an alternative implementation, recovery can be accomplished by use of a checkpointing process that does not prevent the sending of updates during a drain operation. In such implementations, the server associates two timestamps with each checkpoint. The first timestamp (Ts) is taken before the server starts writing the checkpoint, i.e., before the server commits the first entry. The second timestamp (Tf) is taken after the server completes writing the checkpoint, i.e., after the server commits the last entry.

The server allows the distance table to be modified while writing a checkpoint. There are not guarantees as to whether distance table entries modified after Ts and before Tf are included in this checkpoint; however, any distance table entries modified before Ts are included in the checkpoint being written if not included in one of the earlier checkpoints written by the server. Any distance table entries modified after Tf remain uncommitted in memory and will be included in future checkpoints written by this server, or remain uncommitted in memory.

It thus follows that state changes made by updates that were accepted before Ts are included in the checkpoint being written or in one of the earlier checkpoints written by the server. Furthermore, because updates are only acknowledged after they are accepted or rejected, state changes made by updates that were acknowledged before Ts are included in this checkpoint or in an earlier one. Any entry that was propagated, and thus marked as clean, after Tf will be included in future checkpoints or remain uncommitted in memory.

When a server is restarted it builds its state from all its valid checkpoints. This state will include all changes made by updates it acknowledged before the timestamp Ts associated with its last valid checkpoint. The server needs all peers to resend all state changes that generated updates acknowledged by the restarted server after Ts. Those state changes are not the same as all state changes made after Ts, and not even the same as all state changes that generated updates that were sent after Ts. In general, even an update which was sent very early may have been acknowledged only after Ts.

Using two timestamps, the server can drain all updates sent before a time T, while still sending more updates. Updates are generated and sent in batches in the process of scanning the distance table, as described above. The server adds a bit to each outgoing batch of updates and two counters, one reflecting the number of batches with this bit set, and one reflecting the number of batches with this bit unset. These counters are updated when a new batch is added (increment), and when an active batch is acknowledged (decrement).

The server uses this scheme to perform a drain while still sending updates as follows. Assume all outstanding batches have this bit set. This means one of the counters is 0, and the other is equal to the number of outstanding batches. At time Tb, the server begins the drain by flipping a bit, resulting in all new batches having their bit unset. A value of the first counter counting batches with unset bits, which was at 0, will increment as new outgoing update batches are added, and will decrement as they are acknowledged. A value of the second counter counting batches with their bit set will only decrement as these batches are acknowledged (all new batches have their bit unset). The server waits until this second counter decrements to 0, and the server marks the time at which this event occurs as Te. All updates sent before Tb were acknowledged before Te; therefore, all updates acknowledged after Te must have been sent after Tb. Thus, the next time the server performs a drain, the server reverses the bit and the role of the counters. The server can only start a new drain once the previous one completed (i.e., one of the counters must be 0).

Consequently, when the server is to write a checkpoint, the server first takes a timestamp Ts. The server writes the checkpoint. After committing the last entry, the server starts a drain (at time Tb). While waiting for the drain to complete, the server is allowed to continue sending updates. When the drain completes, it is time Te which will be time Tf. The server associates Ts and Tf with the checkpoint. Any updates acknowledged after Tf (Te) were sent after Tb, and thus will be included in future checkpoints or remain uncommitted in memory. Therefore, when a peer requests all updates acknowledged after T, the requests are generated from the checkpoints with Tf>T and uncommitted data in the distance table in memory.

Server Tasks

The server performs the following tasks in the following priority order, performing a lower priority task only if no higher priority ones exist. The following list is in decreasing priority order, and operational specifics of one implementation are also described:

1) Handle Tasks: Run asynchronous rare tasks such as generating a status pages or handling peer handshakes.

2) Queue Seeks: Queue link graph seek requests for outgoing links from dirty entries. Link graph seeks are done in separate IO threads. The server queues seek requests as soon as possible so that results are ready when the server needs them.

3) Checkpoint: Write a checkpoint, if conditions are right (e.g., if enough time has passed since last one was written).

4) Flush Leaves: Flush leaf table to disk, if enough leaves entries exist.

5) Handle acknowledgements: Handle acknowledgements for updates sent by the server, releasing the next full batch of updates for the acknowledging shard a batch exists.

6) Process Updates: Process incoming distance updates.

7) Propagate Distances: Propagate nearest seeds for dirty entries.

8) Send Small Batches: While update batches of a certain size are sent promptly, "small batches" are sent at the lowest priority, only if there is nothing better to do and if enough time has passed since the server last sent small batches.

Starting the Computation

At startup, all servers copy the link map from the GFS to their local disks. The master server or process monitors the number of link map entries which where not yet copied over for each server. It then selects the servers which still have the most entries to copy over and allows them to use more resources for the copy.

The computation starts after the server populates the distance table, one entry per source node in the link map. Because reading in the link map consumes a lot of time, the system can provide a separate key map for each link map file. The key map is identical to the link map, except the entries contain only empty values—there are no outgoing links. So the key map is much smaller then the link map, and can be read relatively quickly.

After the distance table is populated, the server reads the seed file. The server assign an index to each seed according to the order in which the seeds appear in the file (ignoring duplicates). The server then propagate the updates from each seed belonging to the server's shard. The server does not update the distance table entry for the seed itself. Seeds may have weights associated with them that the server uses as the weights (or distances) of the outgoing links from the seeds in the distance computation for the first propagation.

In order to support high seek throughput the server copies the link map to its local disks as describe below. The link graph is disk based, and link graph lookups (seeks) are a major bottleneck. In order to reduce the seek latency, the server copies the link graph locally and spreads it over all available disks.

Using several local disks, the server realizes a linear speed up in the throughput of random seeks. Sequential seeks are limited by the total throughput of all disk controllers. To avoid the problem of slow and bad disks, the server replicates the local link map copy, so that every entry is available on two different disks. For each seek the server can choose between two disks and avoid disks that return checksum errors. In some implementations, the server also performs load balancing of seeks across disks, so that fewer seeks are performed on slower disks.

Ending the Computation

As has been described, during the computation, servers periodically write checkpoint files and leaf entry files. Checkpoint files contain a snapshot of all entries which where modified since the last checkpoint was written. Leaf files contain all entries which where added to the leaf table since it was last flushed. Both file types are written sorted by node identifier (or, equivalently, sorted by page identifier).

The master server 157 can determine that a computation has ended if the states of all shard servers do not change. In some implementations, each shard server does not track its own state. Instead the master server 157 determines each shard server's state by the number of updates accepted and the startup time of the shard server. If a shard server has not restarted, and has not accepted any new updates, then its state has not change. As described above, an update is considered accepted if it causes a change to the distance table (or leaf table). The number of accepted updates is an ever increasing value for each server, and is a value that the servers export to the master server 157 for monitoring.

The master server uses a protocol analogous to a "two phase commit" to determine when the computation is done. The master server obtains the states from all shard servers, and if all the states indicate that the shard severs have completed their respective processes, the master server instructs the shard the servers to write final results. However, there are conditions in which additional updates may occur after the master server instructs the shard servers to write the final results.

One such condition is a race condition. For example, the master server may determine that a first shard server has finished at a first time t1. After time t1 but before a second time t2, the first shard server receives an update from a second shard server. At time t2, the master server will determine that the second server is finished, as the second server contains only clean entries as a result of sending its update to the first shard server. The first shard server, however, has changed state.

Another condition is a failure. For example, the master server may determine that a first shard server has finished at a first time t1, but after t1 and before writing the final results the first shard server fails and must recover.

Accordingly, after all the shard servers write the final results, the master server again checks if any state has changed since the master received the states from all the shard servers. If any state has changed, then the master server again instructs the servers to write the finals results. If no state has changed, the computation is finished.

In some implementations the master server 157 can determine if states have changed by aggregating the number of accepted updates and number of restarts for the shard servers before writing the final results (A0 and R0) and after the shard servers write the final results (A1 and R1). Additionally, the number of dirty entries (D), the number updates in transmission (I) and the number of recovering servers (R) can also be monitored after writing the final results. If the number of accepted updates and the number of restarts have not changed, i.e., A0=A1 and R0=R1, and if the number of dirty entries D, number of transmitted updates I and number of recovers servers R are all 0, then no state among the servers has changed.

Once the master server or process determines that no more dirty entries exist on the servers and no more distance updates are outstanding, it request all servers to write one final checkpoint file and leaf file. The result of the computation is then contained in all the checkpoint and leaf files. These files can later be merged by a separate process. This final merging step can also calculate a rank per page based on the three nearest seeds found and their distances.

Threading Model

The following paragraphs describe a threading model used in some implementations of the shard servers.

The servers use a predetermined number of worker threads (e.g., three) that may be specified by a command-line flag. The threads are symmetric in the sense that any of the threads can do the same kind of tasks and operate on all the data. The servers do not subdivide nodes among the threads, or have different threads for different tasks. In addition, the servers may start network threads and link graph seeker threads. Link graph seeking associated with seeker threads is described in more detail below.

Each worker thread loops continuously, performing tasks in the priority order described above. Some tasks, like queuing seeks, checkpointing and sending small batches are performed only by one thread at a time, because they should be executed in some order.

Similarly, initialization is carried out by one thread only; other worker threads are blocked until it is done. In addition, there are other short lived threads that are started up for specific tasks, such as reading the initial graph from GFS.

Figure 6:
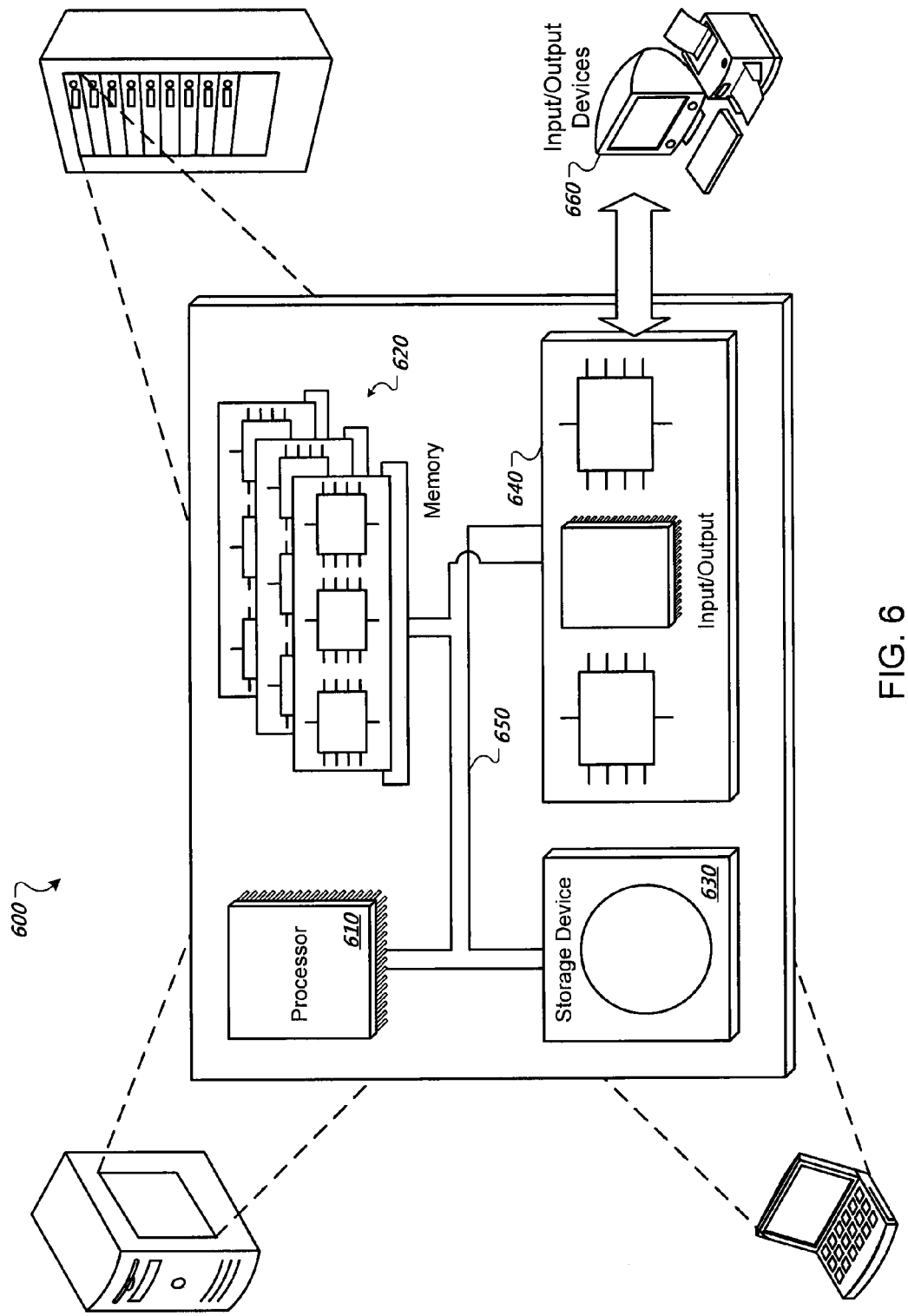
FIG. 6 is a schematic diagram of an example of a generic computer system.

FIG. 6 is block diagram of an example computer system 600. The system 600 includes a processor 610 or more than one processor, a random access memory 620, a large capacity storage device 630, and an input/output device 640. Each of the components 610, 620, 630, and 640 can be interconnected using one or more data pathways 650. In some implementations, the processor 610 is a single-threaded processor. In other implementations, the processor 610 is a multi-threaded processor. The processor 610 is capable of processing instructions stored in the memory 620 or on the storage device 630.

In some implementations, the input/output device 640 includes one or more network interface devices, e.g., an Ethernet card, a serial communication device, e.g., and RS-232 port, and/or a wireless interface device, e.g., and 802.11 card. In other implementations the input/output device includes driver devices configured to receive input data and send output data to other input/output devices, e.g., keyboard, printer and display devices 660.

Queries may be received from client devices that may be implemented on computer systems similar to the computer system in FIG. 6. Other implementations, however, may also be used, such as mobile computing devices, mobile communication devices, set-top box television client devices, and so on.

Embodiments of the subject matter and the functional operations described in this specification may be implemented in digital electronic circuitry, or in computer software, firmware, or hardware, including the structures disclosed in this specification and their structural equivalents, or in combinations of one or more of them. Implementations of the subject matter described in this specification may be implemented as one or more computer program products, i.e., one or more modules of computer program instructions encoded on a tangible program carrier for execution by, or to control the operation of, data processing apparatus. The tangible program carrier may be a propagated signal or a computer readable medium. The propagated signal is an artificially generated signal, e.g., a machine-generated electrical, optical, or electromagnetic signal that is generated to encode information for transmission to suitable receiver apparatus for execution by a computer. The computer readable medium is a machine-readable storage device, a machine-readable storage substrate, a random or serial access memory device, or a combination of one or more of them.

The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, or declarative or procedural languages, and it may be deployed in any form, including as a stand alone program or as a module, component, subroutine, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations of the subject matter described in this specification may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

While this specification describes many specific implementation details, these should not be construed as limitations on the scope of any invention or of what may be claimed, but rather as descriptions of features that may be specific to particular implementations of particular inventions. Certain features that are described in this specification in the context of separate implementations may also be implemented in combination in a single embodiment. Conversely, various features that are described in the context of a single embodiment may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described above should not be understood as requiring such separation in all implementations, and it should be understood that the described program components and systems may generally be integrated together in a single software product or packaged into multiple software products.

Particular implementations of the subject matter described in this specification have been described. Other implementations are within the scope of the following claims. For example, the actions recited in the claims may be performed in a different order and still achieve desirable results. As one example, the processes depicted in the accompanying figures do not necessarily require the particular order shown, or sequential order, to achieve desirable results.

The invention claimed is:

1. A system, comprising:
multiple computer servers programmed to perform operations comprising:
dividing a directed graph representing web resources and links into shards, wherein the directed graph comprises nodes representing web resources, wherein some of the nodes in the directed graph are designated as seeds, and wherein each shard comprises a respective portion of the graph representing multiple web resources and links associated with the multiple web resources;
assigning each of the shards to a respective server, including assigning, to each of the respective servers, data describing the links associated with the multiple web resources represented by the nodes in the portion of the graph corresponding to the shard assigned to the server; and
determining, by each of the servers and using the data describing the links assigned to the server:
n nearest seeds to each of the nodes in the portion of the graph corresponding to the shard assigned to the server, and
respective distances from each of the nodes in the portion of the graph corresponding to the shard assigned to the server to each of the n nearest seeds to the node, wherein n is a positive integer greater than one.

2. The system of claim 1, the operations further comprising:
ranking the web resources based on the distances.

3. The system of claim 1, wherein n is equal to three.

4. The system of claim 1, wherein the n nearest seeds to the node are those nodes designated as seeds having the n shortest distances to the node.

5. The system of claim 1, the operations further comprising:
  storing, by each of the servers, the distances in a distance table maintained by the server.

6. The system of claim 1, the operations further comprising:
  receiving data identifying some of the web resources represented by nodes in the directed graph as seed resources; and
  designating the nodes representing the identified web resources as seeds.

7. The system of claim 1, wherein the data describing the links associated with the multiple web resources represented by the nodes in the portion of the graph corresponding to the shard assigned to the server comprises data identifying, for each web resource represented by a node in the portion of the graph corresponding to the shard assigned to the server, any outgoing links from the web resource and a target node linked to by each outgoing link.

8. A method performed by multiple computer servers, the method comprising:
  dividing a directed graph representing web resources and links into shards, wherein the directed graph comprises nodes representing web resources, wherein some of the nodes in the directed graph are designated as seeds, and wherein each shard comprises a respective portion of the graph representing multiple web resources and links associated with the multiple web resources;
  assigning each of the shards to a respective server, including assigning, to each of the respective servers, data describing the links associated with the multiple web resources represented by the nodes in the portion of the graph corresponding to the shard assigned to the server; and
  determining, by each of the servers and using the data describing the links assigned to the server:
    n nearest seeds to each of the nodes in the portion of the graph corresponding to the shard assigned to the server, and
    respective distances from each of the nodes in the portion of the graph corresponding to the shard assigned to the server to each of the n nearest seeds to the node, wherein n is a positive integer greater than one.

9. The method of claim 8, further comprising:
  ranking the web resources based on the distances.

10. The method of claim 8, wherein n is equal to three.

11. The method of claim 8, wherein the n nearest seeds to the node are those nodes designated as seeds having the n shortest distances to the node.

12. The method of claim 8, further comprising:
  storing, by each of the servers, the distances in a distance table maintained by the server.

13. The method of claim 8, further comprising:
  receiving data identifying some of the web resources represented by nodes in the directed graph as seed resources; and
  designating the nodes representing the identified web resources as seeds.

14. The method of claim 8, wherein the data describing the links associated with the multiple web resources represented by the nodes in the portion of the graph corresponding to the shard assigned to the server comprises data identifying, for each web resource represented by a node in the portion of the graph corresponding to the shard assigned to the server, any outgoing links from the web resource and a target node linked to by each outgoing link.

15. One or more non-transitory computer storage media storing instructions that, when executed by multiple computer servers, cause the computer servers to perform operations comprising:
  dividing a directed graph representing web resources and links into shards, wherein the directed graph comprises nodes representing web resources, wherein some of the nodes in the directed graph are designated as seeds, and wherein each shard comprises a respective portion of the graph representing multiple web resources and links associated with the multiple web resources;
  assigning each of the shards to a respective server, including assigning, to each of the respective servers, data describing the links associated with the multiple web resources represented by the nodes in the portion of the graph corresponding to the shard assigned to the server; and
  determining, by each of the servers and using the data describing the links assigned to the server:
    n nearest seeds to each of the nodes in the portion of the graph corresponding to the shard assigned to the server, and
    respective distances from each of the nodes in the portion of the graph corresponding to the shard assigned to the server to each of the n nearest seeds to the node, wherein n is a positive integer greater than one.

16. The one or more non-transitory computer storage media of claim 15, the operations further comprising:
  ranking the web resources based on the distances.

17. The one or more non-transitory computer storage media of claim 15, wherein the n nearest seeds to the node are those nodes designated as seeds having the n shortest distances to the node.

18. The one or more non-transitory computer storage media of claim 15, the operations further comprising:
  storing, by each of the servers, the distances in a distance table maintained by the server.

19. The one or more non-transitory computer storage media of claim 15, the operations further comprising:
  receiving data identifying some of the web resources represented by nodes in the directed graph as seed resources; and
  designating the nodes representing the identified web resources as seeds.

20. The one or more non-transitory computer storage media of claim 15, wherein the data describing the links associated with the multiple web resources represented by the nodes in the portion of the graph corresponding to the shard assigned to the server comprises data identifying, for each web resource represented by a node in the portion of the graph corresponding to the shard assigned to the server, any outgoing links from the web resource and a target node linked to by each outgoing link.

* * * * *